United States Patent
Pfeffer (12)

(10) Patent No.: US 6,836,950 B1
(45) Date of Patent: Jan. 4, 2005

(54) METHOD FOR MAKING AN AUTOMOTIVE PUNCHED HEADLINER

(75) Inventor: Jiri J P Pfeffer, Prestice (CZ)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/604,238

(22) Filed: Jul. 3, 2003

(51) Int. Cl.[7] .............................................. B21D 53/88
(52) U.S. Cl. ...................... 29/469.5; 29/897.2; 156/212
(58) Field of Search ............................ 29/469.5, 897.2; 156/212; 296/214

(56) References Cited

U.S. PATENT DOCUMENTS

| | | | |
|---|---|---|---|
| 6,048,809 A | 4/2000 | Brow | |
| 6,070,902 A | 6/2000 | Kowalski | |
| 6,120,090 A | 9/2000 | Van Ert | |
| 6,146,578 A | 11/2000 | Van Ert | |
| 6,322,658 B1 | 11/2001 | Byma | |
| 6,383,320 B1 | 5/2002 | Gebreselassie | |
| 6,451,232 B2 | 9/2002 | Barber | |
| 6,623,068 B2 * | 9/2003 | Wieschermann et al. | ... 296/210 |

* cited by examiner

Primary Examiner—Joseph D. Pape
(74) Attorney, Agent, or Firm—Bill Panagos

(57) ABSTRACT

A method for making a punched headliner 20 adapted to be installed in a motor vehicle is provided. The method includes placing a flange element 32 within a punch tool 12, the punch tool 12 comprising a punching component 14 and a mating component 16. The flange element 32 is placed abutting the mating component 16. A headliner blank 18 is placed within the punch tool 12 between the punching component 14 and the flange element 32. A punching edge 22, positioned on the punching component 14, is moved towards the mating component 16. The headliner blank 18 is thereby pressed between the punching edge 22 and the flange element 32. The punching edge 22 is pressed into contact with the flange element 32 such that a shearing edge 54 is formed on the headliner blank 18 and a waste component 46 is separated from the headliner blank 18.

16 Claims, 1 Drawing Sheet

METHOD FOR MAKING AN AUTOMOTIVE PUNCHED HEADLINER

BACKGROUND OF INVENTION

The present invention relates generally to a method for making an automotive headliner and more particularly to a method for making a punched automotive headliner.

Vehicle headliners are commonly utilized in automotive design and construction in order to improve the appearance of the inside of the automobile. In addition, headliners may be utilized to provide sound absorption in order to improve passenger comfort. Headliners are preferably lightweight and rigid and may be mounted to the roof in a variety of fashions. They commonly must accommodate a variety of features such as sunroofs, lighting, entertainment features, ventilation, and most recently safety features.

As the resultant complexity of the vehicle headliner form has increased in response to these features, so too has the complexity of manufacturing the headliner. Traditional punch methodologies utilized to generate proper form in a headliner blank can experience undesirable fatigue when utilized to continuously generate orifices within the blank to accommodate these features. Traditional punch methodologies place the headliner blank within a punch tool between a punching component and a mating component. The punching component is pressed towards the mating component until it punches through the headliner blank and contacts the mating component. This in turn removes waste from the headliner blank and thereby forms the desired orifices and other shapes.

It is known, however, that repeated engagement of the cutting edge on the punching component with the mating component can serve to dull the cutting edge and reduce its effectiveness. In short term degradation, this may negatively impact the quality of the sheared edge of the headliner which in turn may impact installation and customer satisfaction. Over longer term degradation, the cutting edge may experience greater difficulty in effectuating the punch itself and may require replacement. Such replacement requirements can impact manufacturing costs, which in turn impact the part and automotive cost basis. A more robust punch methodology that preserved the cutting edge over greater usage could be utilized to provide improvements to the manufacturing costs.

In addition to the robustness of punch tooling, existing methodologies leave room for improvement in the headliner design. Commonly, in areas surrounding the outer edge of the headliner or feature areas, the headliner blank material is bent to generate a flange. These flanges may be utilized for both appearance as well as assembly considerations. Often it is required that an additional support element be bonded to these flanged areas of the headliner blank such that structural rigidity is preserved and mounting strength is generated. The dual material throughout the generated flanged area can serve to increase the weight of the headliner assembly. This, in turn, effects both cost as well as fuel efficiency of the vehicle. An improved headliner design that minimized material overlap between the headliner blank and support element could be utilized to both reduce weight and lower costs.

It would therefore be highly desirable to have a new method for producing automotive headliners that improved machining robustness. It would further be highly desirable to have an automotive headliner with improved weight savings.

SUMMARY OF INVENTION

It is therefore an object of the present invention to provide a method of producing a punched headliner with improved reliability. It is a further object of the present invention to provide an automotive headliner with reduced weight.

In accordance with the objects of the present invention a method for making a punched headliner adapted to be installed in a motor vehicle is provided. The method includes placing a flange element within a punch tool, the punch tool comprising a punching component and a mating component. The flange element is placed abutting the mating component.

A headliner blank is placed within the punch tool between the punching component and the flange element. A punching edge, positioned on the punching component, is moved towards the mating component. The headliner blank is thereby pressed between the punching edge and the flange element. The punching edge is pressed into contact with the flange element such that a shearing edge is formed on the headliner blank and a waste component is separated from the headliner blank.

Other objects and features of the present invention will become apparent when viewed in light of the detailed description and preferred embodiment when taken in conjunction with the attached drawings and claims.

DETAILED DESCRIPTION

Figure 1:
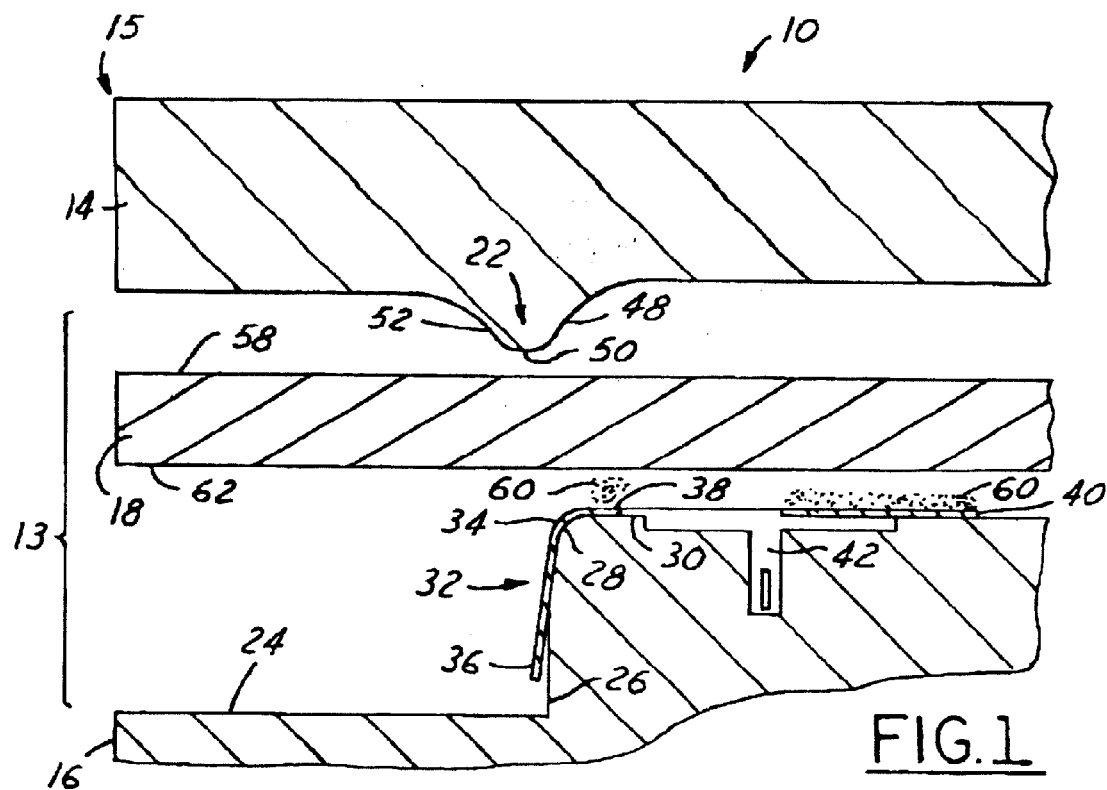
FIG. 1 is an illustration of an apparatus for the production of punched headliner's in accordance with the present invention, the apparatus illustrated in the loaded position.
Figure 2:
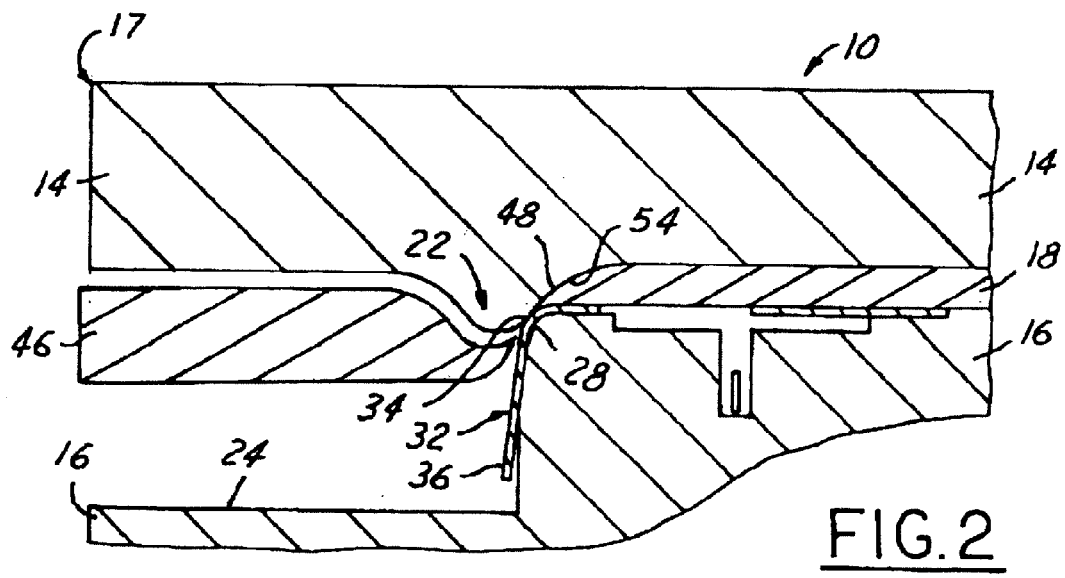
FIG. 2 is an illustration of the apparatus illustrated in FIG. 1, the apparatus illustrated in the compressed position.
Figure 3:
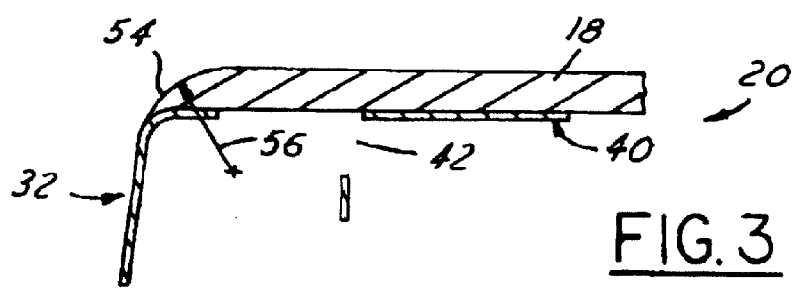
FIG. 3 is an illustration of the automotive headliner manufactured in FIG. 2.

Referring now to FIG. 1, which is an illustration of an apparatus and method for manufacturing punched headliners 10 in accordance with the present invention. The apparatus 10 includes a punching tool 12 comprised of a punching component 14 and a mating component 16. Punching tools 12 are utilized in order to form shapes into headliner blank 18 material in order to produce practical headliner assemblies 20 (see FIG. 3), or similar punched product assemblies, for installation into automobiles. The punching tool 12 includes a material gap 13, for part materials, when in the open position 15. The punching tool 12 closes the material gap 13 by moving the punching component 14 into the closed position 17 (see FIG. 2). The punching component 14 includes a punching edge 22. Known punching edges 22 and components 14 are commonly comprised of hardened metal. When they continuously impact into the mating component 16 the mating component face 24 can wear out and the punching edge 22 may begin crushing into the mating component face 24. This results in undesirable wear on the punching tool 12.

The present invention, however, utilizes a unique punching tool 12 and methodology in order to improve wear characteristics of the punching tool. The present invention includes a mating component 16 comprised of a vertical engagement surface 26, a rounded mating transition edge 28 and an upper horizontal mating surface 30. A flange element 32 is positioned within the punching tool 12 and is placed abutting the mating component 16. Although it is contemplated that the flange element 32 may be inserted in a variety of shapes and conditions, in one embodiment the flange element 32 includes an arched transition portion 34 connecting a vertical extension 36 to a horizontal mounting section 38. The flange element 32, therefore, conforms to the mating component 16. It should be understood, however, that the flange element 32 may be conformed to the mating component 16 during punching operations in alternate embodiments. It should further be understood that the vertical extension 36 is not required to be completely vertical but preferably is angled in relation to the horizontal mounting section 38. In addition, a second flange element 40 may be additionally placed abutting the mating component 16 such that additional mounting capabilities are afforded the headliner assembly 20. A mounting gap 42 may be formed in the second flange element 40, the first flange element 32, or both to provide fastener capabilities.

The headliner blank 18, or other material blank, is positioned within the punching tool 12 such that the flange element 32 is positioned between the headliner blank 18 and the mating component 16. The headliner blank 18 is further positioned such that it is between the flange element 32 and a punching edge 22 formed on the punching component 14. The punching edge 22, in turn, is positioned such that both the headliner blank 18 and the flange element 32 are positioned between the punching edge 22 and the mating component 16. In this fashion, the punching edge 22 can punch through the headliner blank 18, thereby generating waste component 46, and impact the flange element 32 (see FIG. 2). Since the punching edge 22 impacts the flange element 32 rather than the mating component 16, the punching edge 22 impacts a virgin flange element 32 upon each operation (as a new flange element 32 and headliner blank 18 are inserted). This prevents the undesirable wear of the mating component 16 and subsequent dulling of the punching edge 22 experienced by known designs.

Although a variety of punching edges 22 are contemplated by the present invention, one embodiment contemplates the use of a punching edge 22 comprised of a first angled edge 48, a rounded leading surface 50, and a second edge 52. The punching edge 22 is positioned such that the first angled edge 48 generates a shearing edge 54 in the headliner blank 18 and impacts the flange element 32, after shearing the headliner blank 18, along the arched transition portion 34. It is contemplated that the punching edge 22 should finish shearing the headliner blank 18 prior to any portion of the punching edge 22 contacting the mating component 16. The punching edge 44 thereby generates a shearing edge radius of curvature 56 that forms a tangent with the arched transition portion 34 of the flange element 32. In this fashion, a contiguous surface is generated from the headliner upper surface 58 to the vertical extension 36 of the flange element 32. This improves appearance and allows the flange element vertical extension 36 to act as the sole vertical support for the headliner assembly 10 rather that the combination of headliner blank 18/support 32 previously utilized. This allows for a reduction in weight of the headliner assembly 20 or similar punched product assemblies.

Although the flange element 32 may be attached to the headliner blank 18 in a process subsequent to the punching operations, in one embodiment it is contemplated that a bonding material 60 may be positioned between the horizontal mounting section 30 of the flange element 32 and the headliner lower surface 62. This provides for the flange element 32 to be joined to the headliner lower surface 62 during the punching operation and reduces the number of manufacturing steps. In addition, this embodiment helps ensure the alignment of the headliner shearing edge 54 with the flange element 32.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A method for making a punched headliner adapted to be installed in a motor vehicle, the method comprising:

placing a flange element within a punch tool, said punch tool comprising a punching component and a mating component, said flange element placed abutting said mating component;

placing a headliner blank within said punch tool, said headliner blank positioned between said punching component and said flange element;

moving a punching edge towards said mating component, said punching edge positioned on said punching component;

compressing said headliner blank between said punching edge and said flange element; and pressing said punching edge into contact with said flange element such that a shearing edge is formed on said headliner blank and a waste component is separated from said headliner blank.

2. A method for making a punched headliner adapted to be installed in a motor vehicle as described in claim 1, further comprising:

bonding said flange element to an underside surface of said headliner blank.

3. A method for making a punched headliner adapted to be installed in a motor vehicle as described in claim 1, wherein said flange element comprises: an arched transition portion connecting a vertical extension to a horizontal mounting section, said horizontal mounting section pressed into communication with said headliner blank by said punching component.

4. A method for making a punched headliner adapted to be installed in a motor vehicle as described in claim 1, wherein said punching edge comprises a first angled edge, a rounded leading surface, and a second edge; said first angled edge generating shearing against said headliner blank such that said first angled edge shears said headliner blank and subsequently contacts said flange element.

5. A method for making a punched headliner adapted to be installed in a motor vehicle as described in claim 1, further comprising:

pressing said punching edge into contact with said flange element such that said shearing edge is formed with a shearing edge radius of curvature.

6. A method for making a punched headliner adapted to be installed in a motor vehicle as described in claim 5, further comprising:

forming said shearing edge radius of curvature to tangentially mate with an arched transition portion of said flange element.

7. A method for making a punched headliner adapted to be installed in a motor vehicle as described in claim 1, wherein said mating component includes a mating edge comprising an upper horizontal mating surface, a vertical mating engagement surface, and a rounding mating transition edge; said flange element shaped to conform to said mating edge.

8. A method for making a punched headliner adapted to be installed in a motor vehicle as described in claim 7, wherein said flange element includes a vertical extension section, said vertical extension section shorter than said vertical mating engagement surface.

9. A method for making a punched product assembly, the method comprising:

placing a flange element within a punch tool, said punch tool comprising a punching component and a mating component, said flange element placed abutting said mating component, and said mating component including a mating edge comprising an upper horizontal mating surface, a vertical mating engagement surface, and a rounded mating transition edge;

placing a material blank within said punch tool, said material blank positioned between said punching component and said flange element;

moving a punching edge towards said mating component, said punching edge positioned on said punching component and including a first angled edge and a rounded leading surface;

compressing said material blank between said first angled edge and said flange element in the location of said rounded mating transition edge; and pressing said punching edge into contact with said flange element such that a shearing edge is formed on said material blank and a waste component is separated from said material blank.

10. A method for making a punched product assembly as described in claim 9, further comprising:

applying a bonding material between said flange element and an underside surface of said material blank prior to said compressing of said material blank.

11. A method for making a punched product assembly as described in claim 9, wherein said flange element comprises:

an arched transition portion connecting a vertical extension to a horizontal mounting section, said horizontal mounting section pressed into communication with said material blank by said punching component.

12. A method for making a punched product assembly as described in claim 9, further comprising:

pressing said punching edge into contact with said flange element such that said shearing edge is formed with a shearing edge radius of curvature.

13. A method for making a punched product assembly as described in claim 12, further comprising:

forming said shearing edge radius of curvature to tangentially mate with an arched transition portion of said flange element.

14. A method for making a punched product assembly as described in claim 9, wherein said flange element is preformed to conform to said mating edge.

15. A method for making a punched product assembly as described in claim 9, wherein said flange element includes a vertical extension section, said vertical extension section shorter than said vertical mating engagement surface.

16. A method for making a punched product assembly as described in claim 9, further comprising:

placing a secondary flange element within said punch tool prior to said compressing said material blank, said secondary flange element positioned remote from said shearing edge.

\* \* \* \* \*